United States Patent [19]

Auer

[11] 4,072,348
[45] Feb. 7, 1978

[54] SAFETY DEVICE FOR USE IN A VEHICLE HAVING A SEAT
[76] Inventor: Josef Auer, Ladestrasse4, Worgl, Austria
[21] Appl. No.: 691,587
[22] Filed: June 1, 1976
[30] Foreign Application Priority Data
June 3, 1975 Austria .................................. 4212/75
Feb. 24, 1976 Austria .................................. 1346/76
[51] Int. Cl.² ............................................. B60R 21/10
[52] U.S. Cl. ................................ 297/386; 24/201 A; 24/211 P; 24/230 AS; 280/746; 294/83 AB
[58] Field of Search ............... 297/386, 385, 388, 389; 280/744, 746; 24/230 A, 230 AT, 230 AV, 230 AS, 201 A, 201 D, 201 TR, 211 P, 115 F; 244/150, 151 B; 294/83 AB, 83 A, 83 R

[56] References Cited
U.S. PATENT DOCUMENTS
3,241,205   3/1966   Genin .............................. 297/386 X
FOREIGN PATENT DOCUMENTS
262,809    6/1968   Austria ............................... 297/385
2,352,897  4/1975   Germany ......................... 24/230 AT
2,363,973  7/1975   Germany ......................... 24/230 AT
2,404,342  7/1975   Germany ........................... 24/230 A
2,423,294  11/1975  Germany ............................ 280/744
877,614    9/1961   United Kingdom ............... 294/83 A Primary Examiner—Roy D. Frazier
Assistant Examiner—William E. Lyddane
Attorney, Agent, or Firm—Kurt Kelman

[57] ABSTRACT

A safety belt is adapted to be applied to a person who occupies a seat. Belt-fixing means are adapted to releasably hold said belt in position for retaining such person on said seat when said belt is applied to such person. First and second control elements are movable relative to each other in a predetermined direction to an enabling position in response to a tensile load on said belt in excess of a predetermined value. Detent means are arranged to prevent a movement of said first and second control elements relative to each other out of said enabling position opposite to said predetermined direction. A drive spring is connected to said first and second control elements and arranged to be stressed as they move in said predetermined direction. A retarding mechanism is adapted to perform a predetermined stroke under the action of said spring when said first and second control elements are in said enabling position. Belt-releasing means are arranged to release said belt from said belt-fixing means when said retarding mechanism has completed said predetermined stroke.

6 Claims, 5 Drawing Figures

SAFETY DEVICE FOR USE IN A VEHICLE HAVING A SEAT

This invention relates to a safety device which is intended for use in vehicles, particularly in motor vehicles, and in the same or a modified form also in aircraft, motorboats and rail-borne vehicles.

The invention relates specifically to a safety device which comprises a safety belt for a person which occupies a seat and control means, which are provided on a buckle of the belt or on a mounting for the belt and are responsive to a load on the belt and in response to a load in excess of a predetermined value operate release means for releasing the belt with a time delay which is controlled by a spring-driven retarding mechanism.

Such safety devices have generally the purpose to ensure in case of an accident that the person to which the belt has been applied is initially held properly on the seat by the belt. The control means serve to release the person from the belt after the accident so that the person can free himself or herself from the belt easily and without need for reflection. It must be borne in mind that persons who have suffered an accident are often shocked or considerably injured and for this reason can open the belt only with difficulty. The early release of a person who has applied the belt will be particularly important when the vehicle has been inflamed or is about to be submerged in water. Conventional safety belts have various buckles and various manually operable release members. An automatically releasing belt would also facilitate the work of rescue people in action after an accident.

Known safety devices of the present kind always comprise a retarding mechanism, which is similar to a watch movement and is driven by a spring that has been stressed before the safety device is installed. When the belt is tensioned, it acts normally on a shear pin, which defines the predetermined load. When that load is exceeded, the shear pin breaks to start the retarding mechanism. When the retarding mechanism has completed its stroke, it operates locking pins or locking sleeves or detent mechanisms which then release the buckle of the belt or a part of the belt that is connected to mounting means so that the belt is then released.

An important disadvantage of the known safety devices resides in that the shear pin is stressed by any load on the belt, even if that load is due to normal operating conditions. For this reason the shear pin is deteriorated by a prolonged use of the belt and after such prolonged use may break even under loads which are due to normal operating conditions. The reliablity of operation is also adversely affected by the fact that the spring of the retarding mechanism must be held stressed for considerable time and may suffer fatigue when it is held stressed for years so that a proper operation of the retarding mechanism resulting in an automatic operation of the release means to release the belt may not be ensured when required.

It is an object of the invention to provide a safety device which is of the kind defined and which even after a long time of rest will reliably release the belt in response to a load in excess of the predetermined value and which permits of a simple check of its readiness to release the belt.

A safety device of the kind defined is characterized in accordance with the invention in that the control means comprise two elements, which are movable relative to each other in response to the tensile load on the belt and are arranged to be coupled to each other in response to a load in excess of the predetermined value, and the spring for driving the retarding mechanism is connected between said control elements and adapted to be stressed by a response of the control means.

The device according to the invention differs from the known devices in that the spring for driving the retarding mechanism is not stressed until the control means respond to a load on the belt. As a result, there can be virtually no fatigue of the spring. According to a further feature of the invention, the spring may constitute a buffer spring, which cushions loads applied to the belt. During a strong retardation of the vehicle, the belt will always be loaded as a result of the inertia of the body of the person who has applied the belt. When the load on the belt has exceeded the adjusted, permissible value, the spring will also cushion the body of the person who has applied the belt but this cushioning will not disable the belt. In that case too the person will not be completely released until the retarding mechanism driven by the stressed spring has completed its stroke or when the release means for the belt have been actuated by hand.

The concept of the invention may be embodied in various forms. In accordance with a preferred embodiment, the two elements of the control means consist of a piston and a cylinder and the piston is adapted to be telescopically pulled out of the cylinder against the action of the spring, and limiting means which are controlled by the retarding mechanism are operatively connected to the piston and the spring and prevent a pulling of the entire piston out of the cylinder until the retarding mechanism has completed its stroke. The piston and cylinder may be provided with detent means, which in a predetermined displaced position of the piston interengage to prevent a return of the piston by the spring.

The limiting means may protrude in a position of rest beyond the diameter of the piston to bear on the spring, and the retarding mechanism may be accommodated in the piston and may be arranged to retract said limiting means to a release position within the piston as the retarding mechanism performs its stroke so that the limiting means then disengage the spring, and the piston together with the retracted limiting means can be pulled out of the cylinder. In this arrangement the belt-releasing means itself are not operated to release the belt but the piston mounted in the belt or a holder for the belt can be released to release the person previously retained by the belt.

According to a preferred further feature, the cavity which opens at the forward end of the piston forms a cylinder bore, in which a stop piston is guided, which constitutes a stop for the limiting means, and the cylinder bore is filled with a liquid and provided with an outlet, which is adapted to be opened by the control means and determines the time delay so that when this outlet has been opened the limiting means which are urged by the spring for a pivotal movement can push the stop piston into the cylinder bore to a position in which the limiting means are released.

To improve the functional reliability of the last-mentioned embodiment, means may be provided to prevent an undesired escape of the liquid. To that end, the liquid may be accommodated in a capsule, which is adapted to be torn apart by the control means. Such capsule, which is perfectly tight, can be made of thin plastics material sheeting. In that case, the control means comprise cutting or tearing tools, which open the capsule when the safety device responds to a load on the belt in excess of the permissible value so that liquid can flow out into the cylinder and the piston can compress the capsule.

According to another preferred feature, a reliability of operation through long periods of time is ensured by the provision of means for detecting the level of the liquid, e.g., a liquid level gage, so that a check can be made from the outside whether there is sufficient liquid in the cylinder. The readiness to respond may also be checked by a pull on the belt to ascertain the stress of the spring.

According to a preferred further feature, the liquid is disposed in a bore of the extensible piston between the stop piston and a spring-loaded piston, which is loaded by a spring force that is much smaller than the force of the prestressed spring for driving the retarding mechanism whereas the resistance presented by any ratchet means which prevent a return movement of the piston away from the liquid exceeds the force of the stressed spring for driving the retarding mechanism.

The extensible piston may be provided with severing means, which are accommodated in the housing of the safety device and operable to sever an electric cable which is included in an electric circuit of the motor vehicle so that the response of the safety device interrupts, e.g., the main or ignition circuit of the motor vehicle whereas the usual safety switches having switch contacts that are subjected to wear are not required.

The invention is shown by way of example on the accompanying drawings, in which

FIG. 1 shows a safety device A, which is accommodated in a housing and is combined with a belt buckle to form a unit, which is held by mounting means B adjacent to a seat C of a vehicle. A belt D is shown in an enlarged position.

Figure 2:
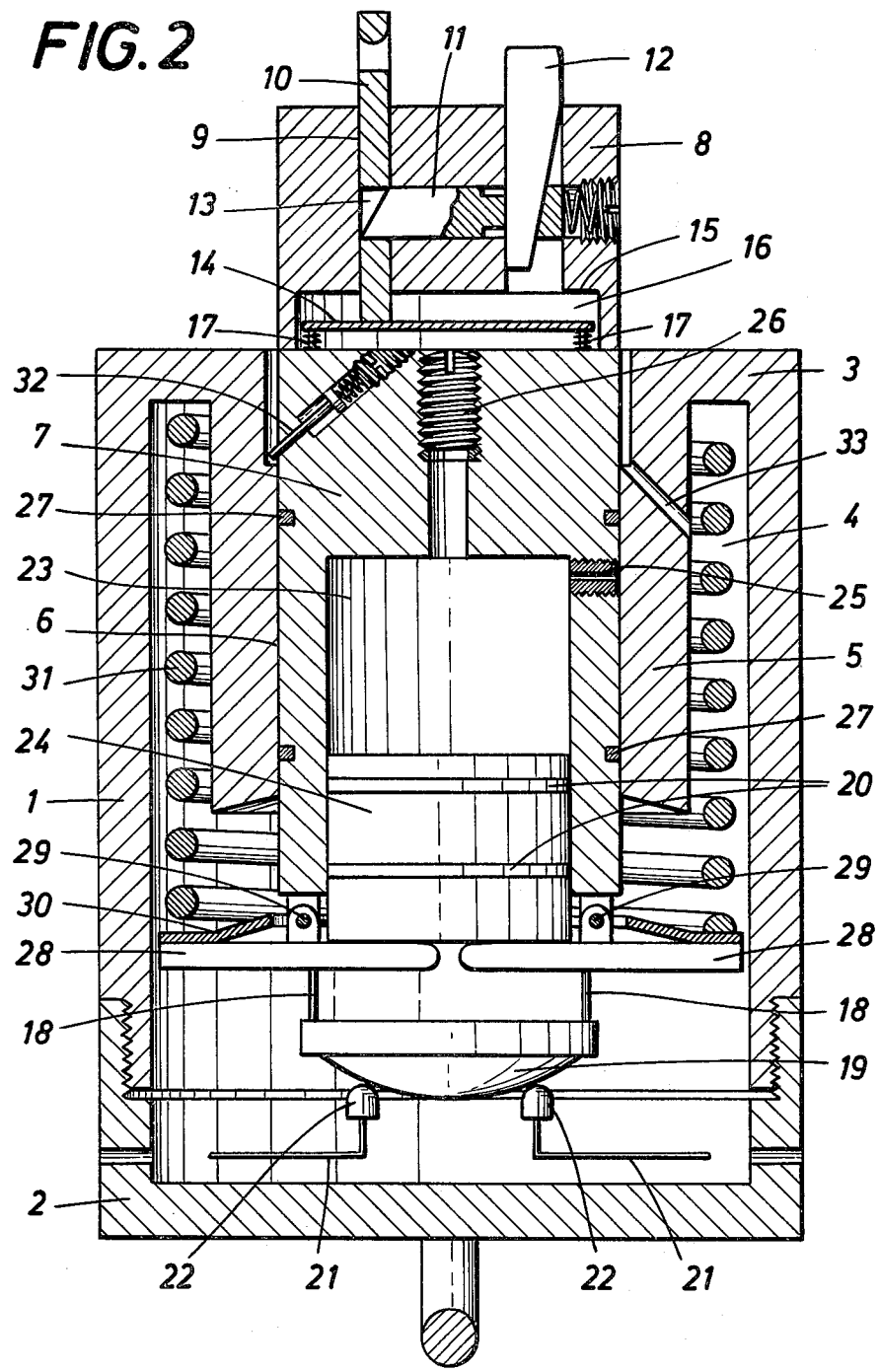
FIG. 2 is a longitudinal sectional view showing the main portion of the safety device in the normal state with the safety belt engaged.

FIG. 2 shows that the device comprises a cylindrical housing 1, which is closed at its lower end by a screw cover 2, which is provided on its underside with an eyelet, which can be connected to the belt-holding means of a motor vehicle. The cylindrical housing 1 contains a bushing 5, which depends from a top 3 of the housing approximately to the middle of the height thereof and defines an annular clearance space 4 with the housing. The bushing 5 contains a cylinder bore 6, in which a piston 7 is slidably guided, which at its top end is connected to a belt buckle 8. Elements 7 and 8 are rigidly interconnected during use but can be separated when screws have been loosened.

The belt buckle comprises a housing 8, which has a slot 9 for receiving a detent member 10 for locking a safety belt. In the engaged position, which is shown, a spring-loaded latch 11 interengages with said detent member 10. The latter can be released in that a push button 12 is actuated to pull the latch 11 out of the hole 13 in the detent member 10.

When the detent member 10 has been engaged, it applies pressure to a plate 14, which initially engages a top surface 15 of the recess 16 and during the insertion of the detent member 10 is pushed down against the action of return springs 17. Rods 18 extending through the piston 7 are connected to the plate 14 and are pushed down as the latter descends. The rods 18 carry at their lower ends a contact member 19, which cooperates with two contacts 22 that are included in a main electric circuit 21 of the motor vehicle so that said main electric circuit is closed when the safety belt has been properly applied.

Figure 1:
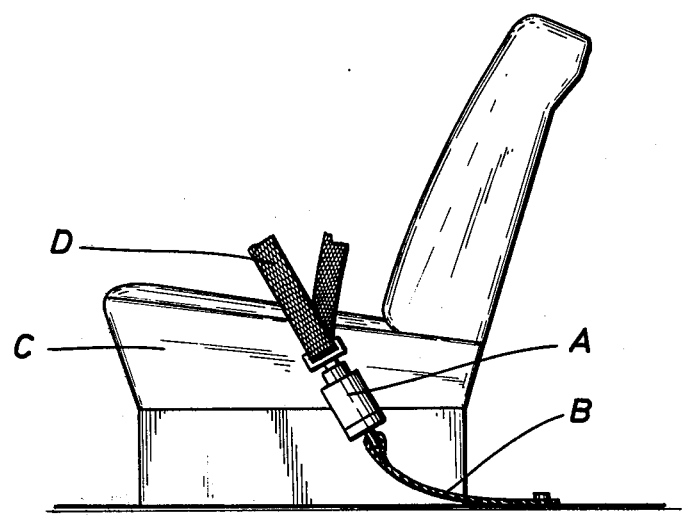
FIG. 1 is a diagrammatic view showing a safety device according to the invention as applied to a safety belt for a seat of the vehicle.

The piston 7 is formed with a downwardly open cylinder bore 23, in which a stop piston 24 is guided by means of sealing rings 20. An outlet 25 which is relatively small in cross-section extends from the upper end of the cylinder bore 23. When the device is in position of rest, that portion of the cylinder bore 23 which is disposed above the piston 24 is filled with a liquid, such as oil, which has been introduced through a bore that has subsequently been closed by a headless screw 26. When the device is in position of rest, seals 27 carried by the piston 7 and engaging the bore 6 prevent an escape of liquid through the outlet 25 so that the stop piston 24 remains in the position shown in FIG. 1.

Two-armed rocker levers 28 are provided in a star-like configuration around the cylinder bore and are angularly spaced from the passages for the rods 18. When the device is in position of rest, the inner arms of said rocker levers engage the underside of the stop piston 24, and the arms disposed outside the pivot bearings 29 protrude radially beyond the outside diameter of the piston 7 and hold an abutment ring 30, which abuts a compression spring 31, a major portion of which is accommodated in the annular clearance space 4. The upper end portion of the piston 7 is formed with an inclined bore, which accommodates a spring-loaded locking pin 32.

Figure 3:
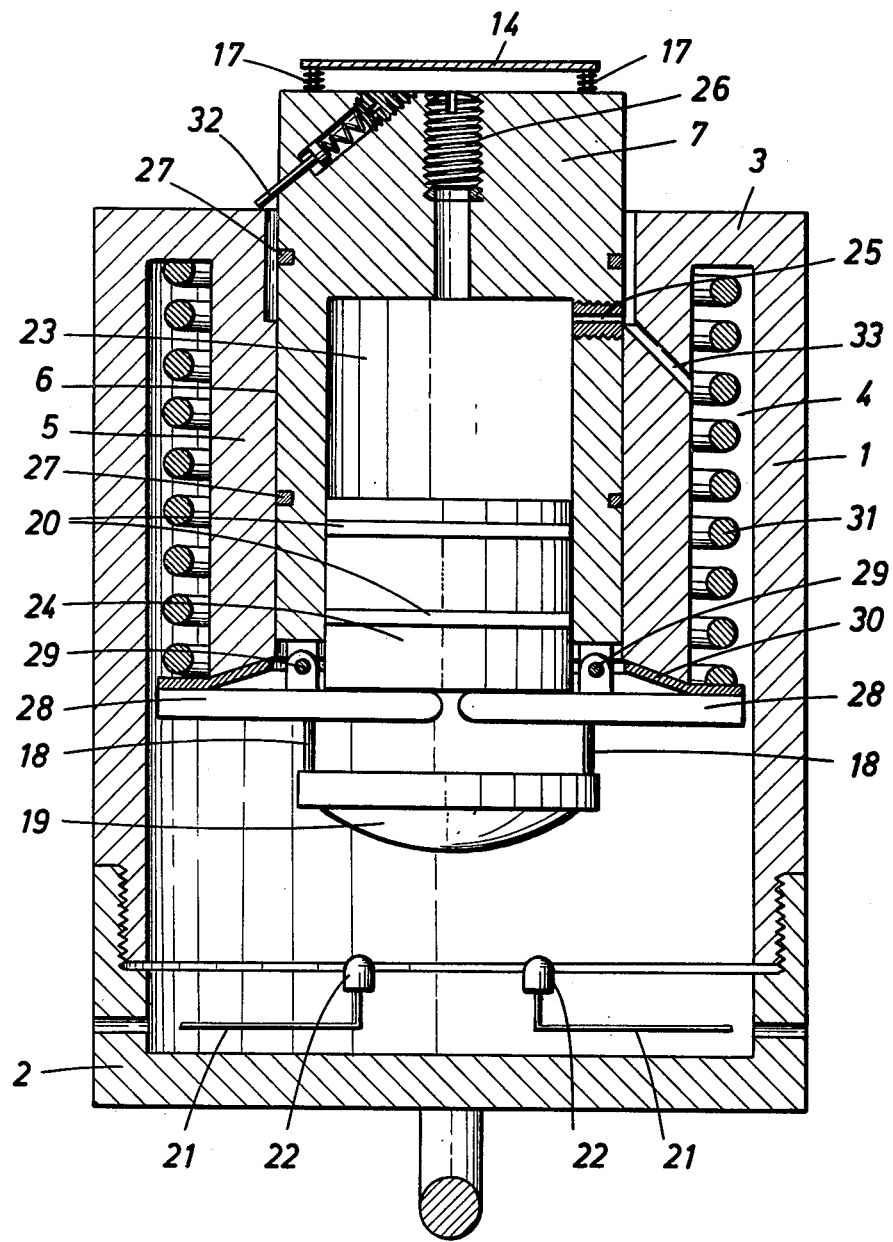
FIG. 3 shows the device of FIG. 2 immediately after its response to an overload.
Figure 4:
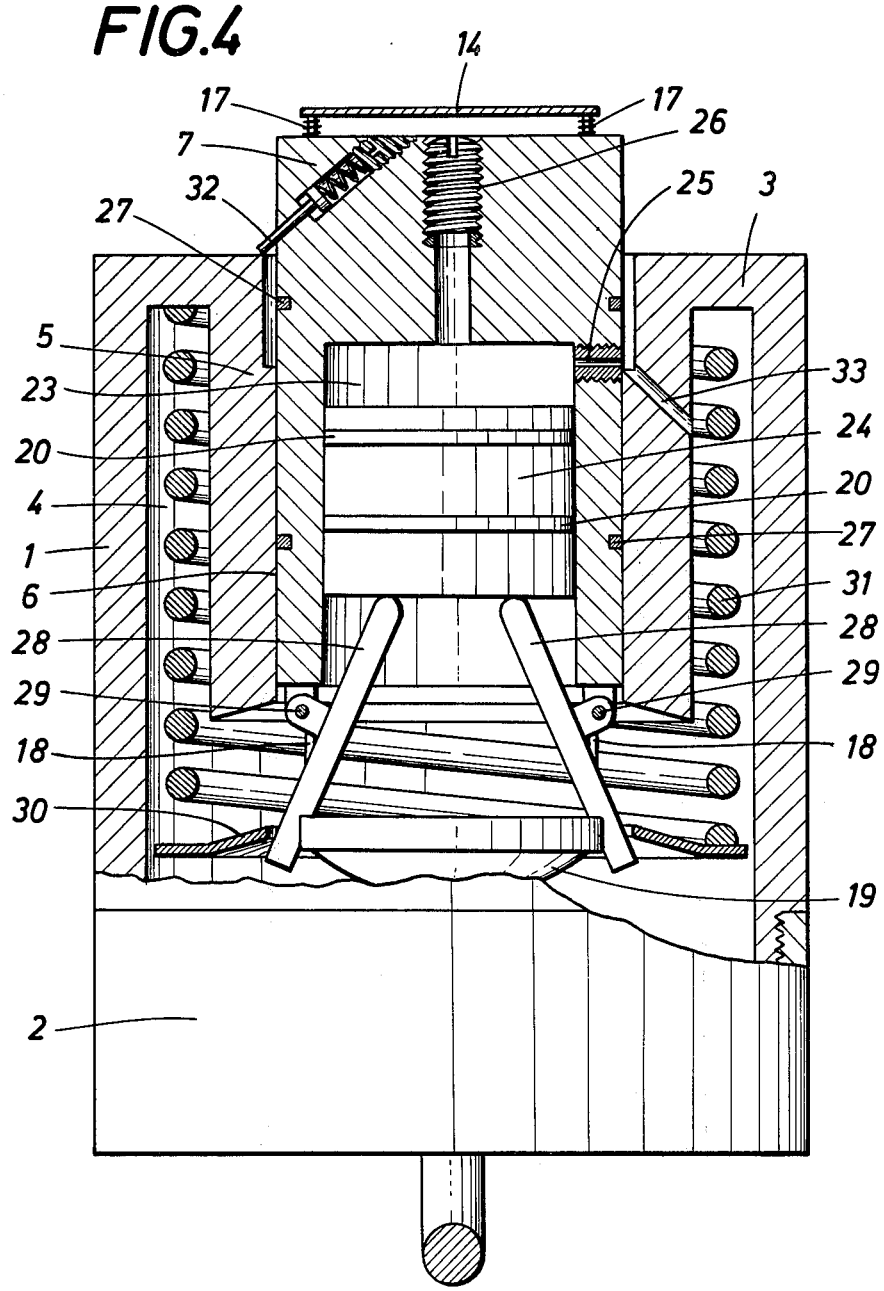
FIG. 4 is a view that is similar to FIG. 3 and shows the condition shortly before the retarding mechanism has completed its stroke.

When the safety belt is subjected by the inertia of the body of the person retained by the belt to a load in excess of the value that is determined by the rate of the spring 31, e.g., as a result of a collision of the vehicle with another, the piston 7 will first be pulled against the action of the spring to the position which is shown in FIG. 3 and in which the ring 30 engages the lower edge of the element 5 and cooperates with the levers 28 to prevent a further pulling of the piston 7. The contact 19 is moved in unison with the piston 7 and interrupts the main electric circuit of the vehicle although the position of the contact relative to the piston 7 is not changed. The locking pin 32 interengages with the cylindrical housing 1 at the top thereof so that the piston 7 cannot return to the position shown in FIG. 2. The outlet 25 is moved to a position in which it registers with a passage 33 leading to the annular clearance space 4 so that the liquid initially disposed above the stop piston 24 can escape. In this manner, piston 24 operates as a retarding mechanism. Because the piston 7 is retained and the outlet 25 has been opened, the spring 31 acting by means of the ring 30 can gradually turn the rocker levers 28, which act as limiting means, so that the stop piston 24 is raised, as shown in FIG. 4. As soon as the ring 30 releases the rocker levers 38, the piston 7 together with the rocker levers mounted thereon can be freely pulled out of the cylinder bore 6 so that the safety belt is released.

Figure 5:
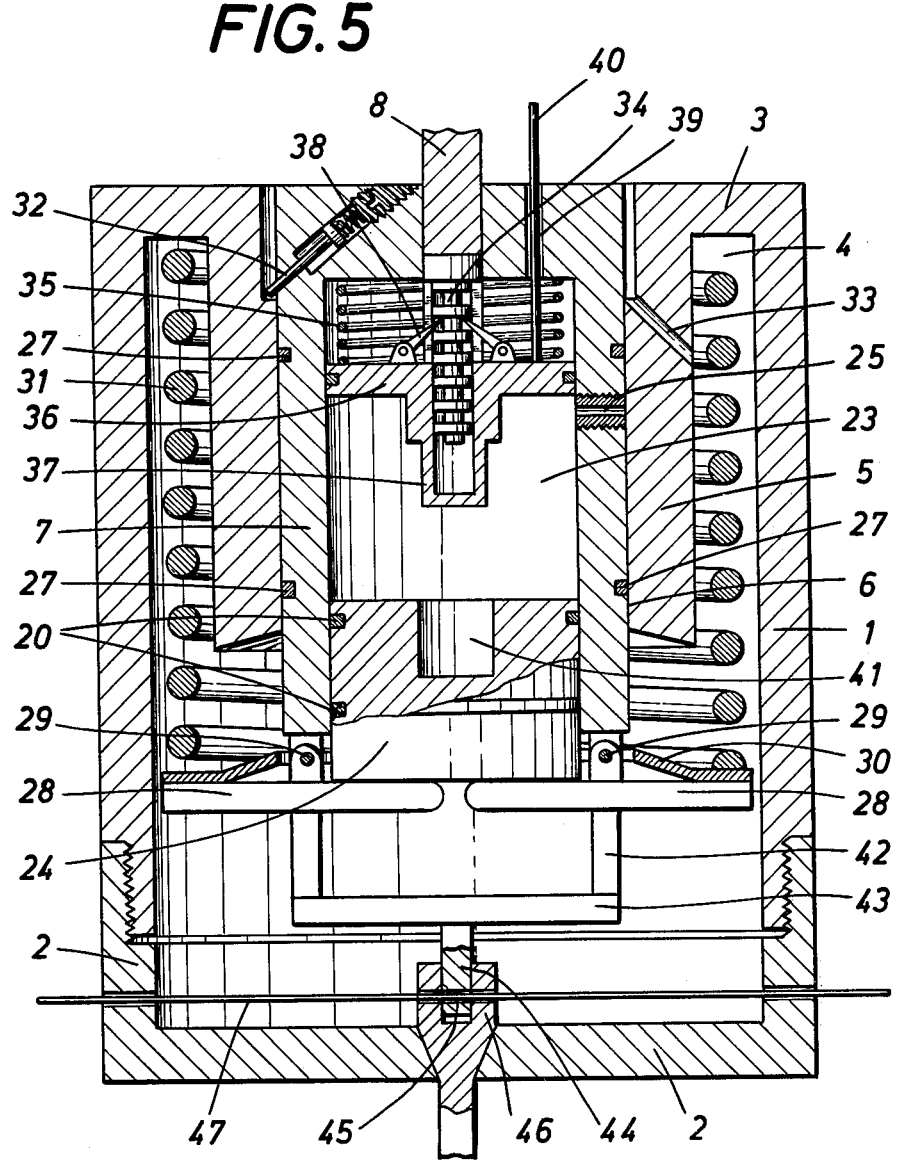
FIG. 5 shows a modified safety device, which comprises a liquid level indicator and means for severing an electric cable.

The embodiment shown in FIG. 5 comprises means for checking the liquid level in the cylinder bore 23 and for making up losses of liquid and for ensuring a reliable function in spite of losses of liquid. The means for interrupting the electric circuit differ also from the corresponding means in the embodiments shown in FIGS. 2 to 4. Like or equivalent parts are designated in FIG. 5 with the same reference characters as in FIGS. 2 to 4.

A ribbed locking pin 34 depends into the cylinder bore 23 from the upper end thereof and is concentrically surrounded by a spring 35, which acts on a piston 36, which carries a bushing 37, which is closed at its end and encloses the locking pin 34. The bushing 37 carries pivoted locking pawls 38, which extend into the recesses of the pin 34. The piston 36 carries also an indicating pin 40, which extends through a bore 39 out of the top part 3 of the housing. A modification of the embodiment shown in FIGS. 2 to 4 resides in that the piston 24 has a recess 41, which can accommodate the end of the bushing 37. The piston 36 ensures that the liquid in the bore 23 is always held under a slightly superatmospheric pressure. When the device is in position of rest, the seals 20 and 27 should prevent an escape of liquid from the bore 23. When liquid is lost although the stop piston 24 is in position of rest, the spring 35 will move the piston 36 downwardly and the pawls 38 will prevent an upward return movement of the piston 36, e.g., in response to shakes in the moving vehicle.

The piston 7 is connected by arms 42 to a carrying plate 43, which carries a knife 44, which has a through bore 45 defined by cutting edges, which can cut through an electric cable 47, which may be included in the main electric circuit or igniting circuit of the motor vehicle and has been introduced through the cover 2 and is held by a retaining member 46. In response to an actuation of the piston 7, the cable 47 is severed so that the electric circuit in which the cable is included is interrupted. Arcing between the mutually opposite ends of the severed cable is prevented because the the knife has removed a portion of the cable. The part 46 consists of insulating material or may comprise inserted metal bushings defining a passage for the cable so that the severing of the cable is facilitated.

When the safety belt is subjected by the inertia of the body of the person retained by the belt to a load in excess of the value that is determined by the rate of the spring 31, e.g., as a result of a collision of the vehicle with another, the piston 7 will first be pulled, as has been described with reference to FIGS. 2 to 4, until the locking pin 32 interengages with the housing 1 at its top to prevent a return movement of the piston 7. The levers 28 remain initially in that position relative to the piston 7 which is shown on the drawing so that the spring 31 is stressed further. The cable 47 is servered.

The previously described response will not be effected if the liquid level in the bore 23 has been excessively lowered. This liquid level is indicated on the outside by the part 40. If the piston 36 is relative to the bore 25 in or slightly above the position shown and is locked by the pin 32, the spring 31 which has been stressed by the upward movement of the piston 7 can turn the levers 28 so that they push the stop piston 24 into the bore 23 and the liquid contained in the bore can now escape through the passage 33, which communicates with the bore 25. As soon as the levers 28 have been turned inwardly, the part 8 together with the piston 7 and the levers 28 carried thereby can be pulled out of the bore 6.

When the piston 36 is in a position below that shown on the drawing so that the piston 36 interrupts the connection between the bore 25 and the liquid and the pawls 38 extend into recesses of the part 34, the stressed spring 31 cannot cause an adjustment by the piston 24, the confined liquid and the piston 36 because the resistance presented by the pawls 38 exceeds the force of the stressed spring 31. As a result, the stop piston 24 is also locked by the confined liquid. The user has become aware from the changed position of part 40 that the liquid level has been lowered and might have caused liquid to be refilled. In an extreme case, all liquid may have escaped from the bore 23. In that case the piston 36 engages the stop piston 24, the extension 37 of the piston 37 extends in the recess 41 and the pawls 38 interengage under the lower end of the pin 34 or overlap each other in that region so that they prevent a penetration of the pin 34 into the sleeve 37 when the piston 24 is raised. In that case, the retarding mechanism is also disabled and the spring 31 can cushion the belt which is tensioned as a result of a collision, but cannot drive the retarding mechanism. The belt can be released by an actuation of the belt buckle.

Various modifications in design are possible within the possibilites which have been suggested.

What is claimed is:

1. A safety device for use in a vehicle having a seat, which comprises
   (a) a safety belt adapted to be affixed at one end relative to the seat and to be applied to a person who occupies the seat,
   (b) a means for releasably holding the belt in position for retaining the person on the seat when the belt is applied to the person, the releasable holding means including
      (1) a control cylinder and a control piston slidably movable in the cylinder, one of said cylinder and said piston adapted to be affixed relative to the seat and the other of said cylinder and said piston adapted to be connected at one end to the other end of the belt, the piston being adapted to be pulled out of the cylinder in a predetermined direction to an enabling position in response to a tensile load on the belt in excess of a predetermined value,
   (c) retaining means arranged to prevent pulling of the control piston out of the control cylinder opposite to the predetermined direction,
   (d) a drive spring acting upon the retaining means and arranged to be stressed as the control piston moves out of the control cylinder against the force of the spring,
   (e) a retarding mechanism adapted to perform a predetermined stroke under the action of the spring when the control cylinder and piston are in the enabling position,
   (f) piston movement limiting means constituted by rocker levers pivoted to the control piston near the other end thereof, the rocker levers having a radially inwardly extending arm and a radially outwardly extending arm, and being pivotal between an extended position, in which the outwardly extending arms extend outside the periphery of the control piston and prevent the control piston from being pulled out of the cylinder, and a retracted position, in which the levers are retracted from the periphery and permit movement of the entire control piston out of the cylinder to release the belt, (1) the retarding mechanism comprising another piston arranged between the control piston and the rocker levers to move from a retaining position to a release position as the retarding mechanism performs the predetermined stroke so as to hold the rocker levers in the extended position when the retarding mechanism is in the retaining position and to permit the rocker levers to move to the retracted position when the retarding mechanism is in the release position.

2. A safety device as set forth in claim 1, in which said drive spring consists of a compressible buffer spring.

3. A safety device as set forth in claim 1, in which
said control piston has a cylinder bore which is open at said other end of said control piston,
said other piston is slidably movable in said cylinder bore,
said control piston is formed with a constricted lateral outlet, which communicates with said cylinder bore,
said cylinder bore is closed except for said open end of said hollow portion and said outlet and is filled with liquid on the side of said other piston opposite to said open end of said control piston, and
said control piston is movable out of said cylinder from a position in which said cylinder covers said outlet to a position in which said control piston exposes said outlet to permit of an escape of liquid out of said cylinder bore through said outlet, whereby said drive spring is adapted to pivotally move said rocker levers from said extended position to said retracted position and thus push said other piston away from said open end of said control piston when the latter is in said enabling position.

4. A safety device as set forth in claim 3, which comprises means for detecting the level of liquid in said cylinder bore.

5. A safety device as claimed in claim 3, in which
a biased piston is slidably movable in said cylinder bore on the side of said other piston opposite to said open end of said hollow portion and adapted to cover said outlet,
a biasing spring is provided, which urges said biased piston toward said stop piston,
said liquid is confined in said cylinder bore between said biased piston and said other piston, and
said drive spring is adapted to exert a force which is stronger than the force exerted by said bias spring when said control piston is in said enabling position.

6. A safety device as claimed in claim 5, which comprises ratchet means arranged to prevent a movement of said biased piston away from said stop piston by presenting a resistance which is stronger than the force exerted by said drive spring when said control piston is in said enabling position.

* * * * *